Figure 1:
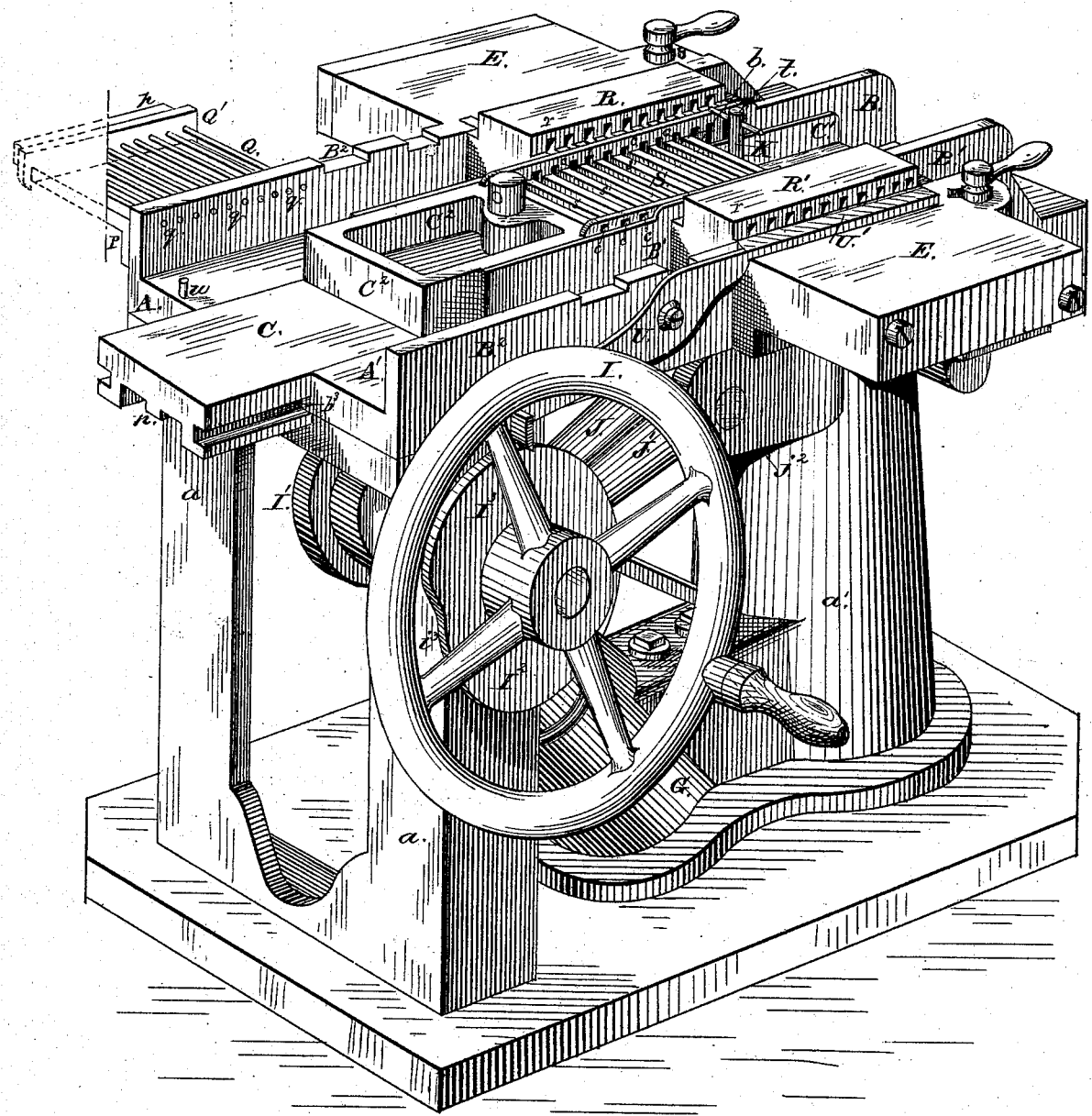

J. NORTH
Type-Distributing Machine.
No. 211,038. Patented Dec. 17, 1878.

Witnesses:
T. C. Brecht
J. A. Rutherford

Inventor:
John North,
By James L. Norris.
Attorney.

7 Sheets—Sheet 3.
J. NORTH
Type-Distributing Machine.
No. 211,038. Patented Dec. 17, 1878.
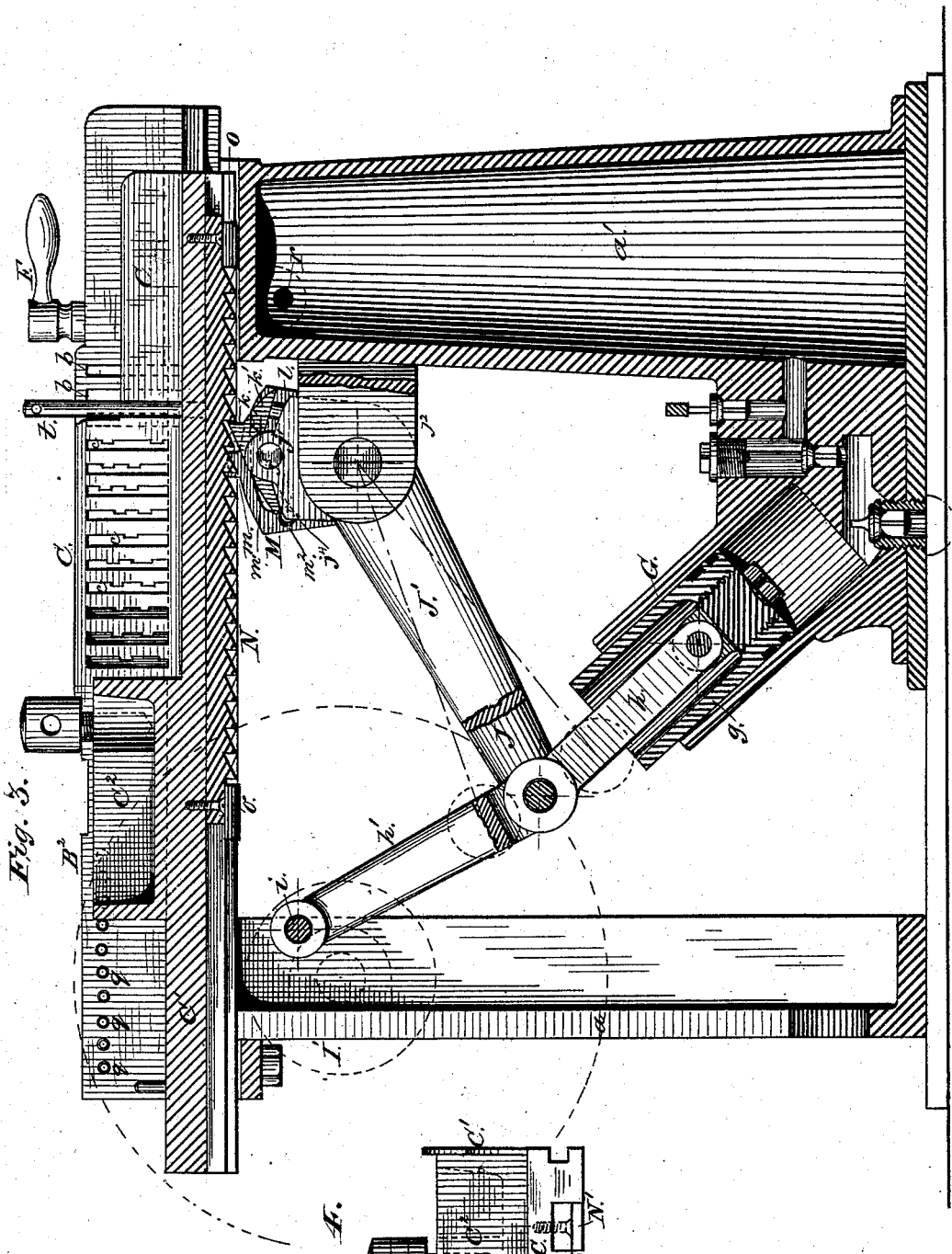
Witnesses:
T. C. Brecht
J. A. Rutherford
Inventor.
John North,
By James L. Norris,
Attorney.

7 Sheets—Sheet 4.
J. NORTH
Type-Distributing Machine.
No. 211,038. Patented Dec. 17, 1878.
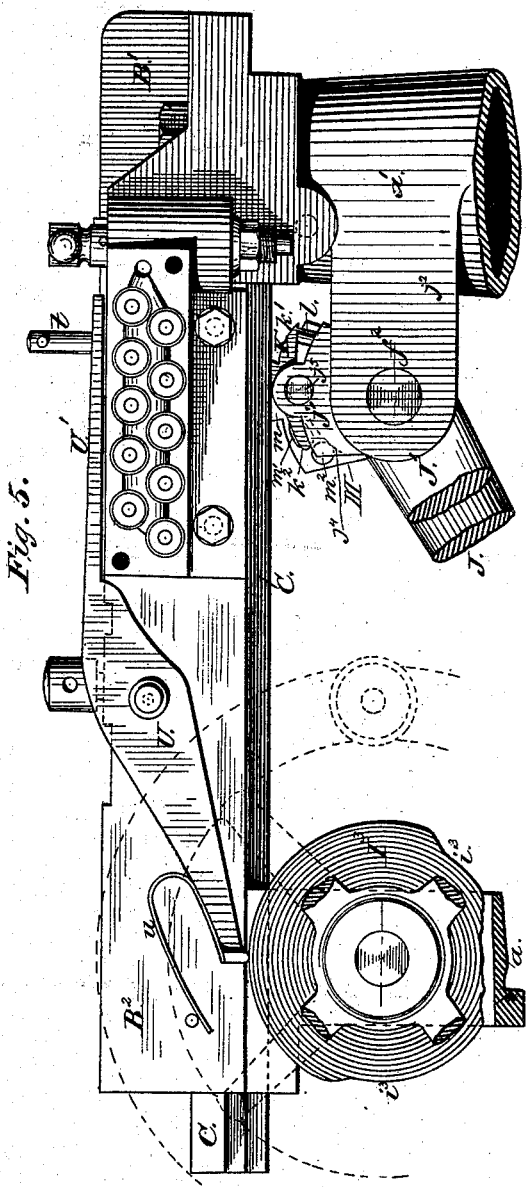
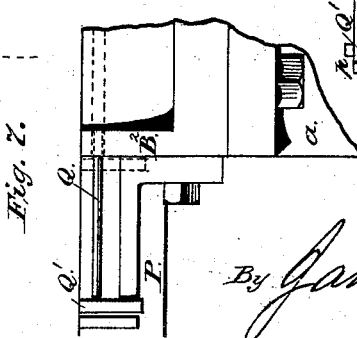
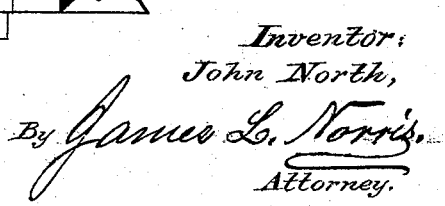
Witnesses:
Inventor:
John North,
By James L. Norris,
Attorney.

7 Sheets—Sheet 5.
J. NORTH.
Type-Distributing Machine.
No. 211,038. Patented Dec. 17, 1878.
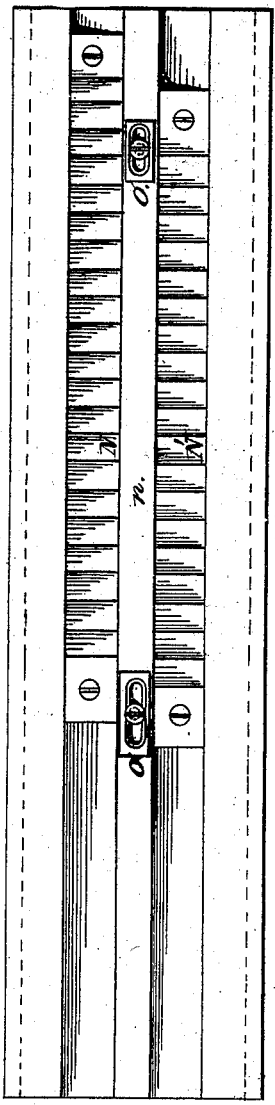
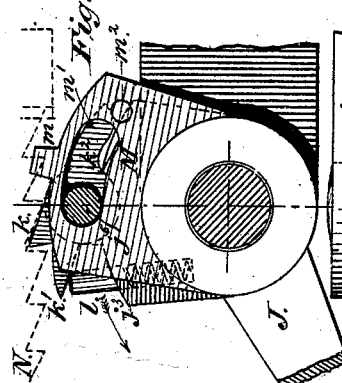
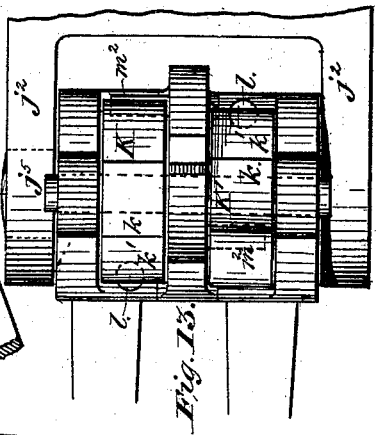
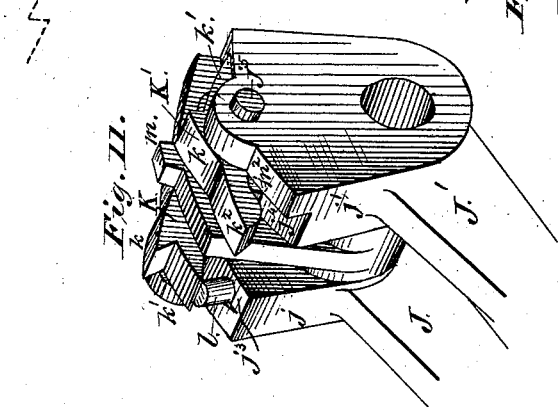
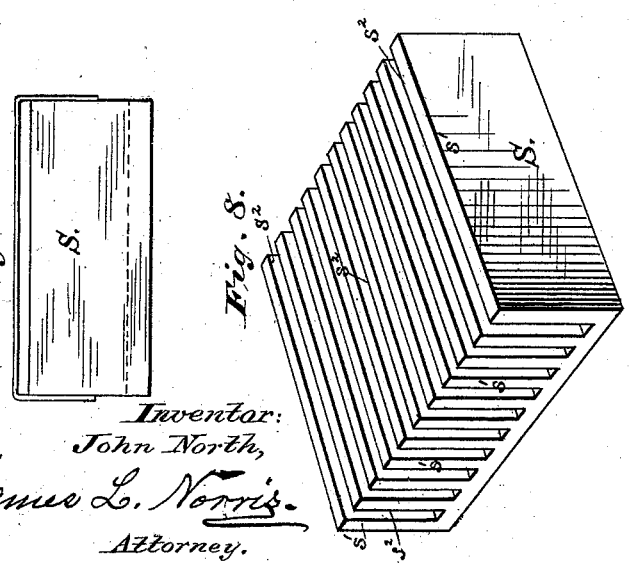
Witnesses:
Inventor:
John North,
By James L. Norris.
Attorney.

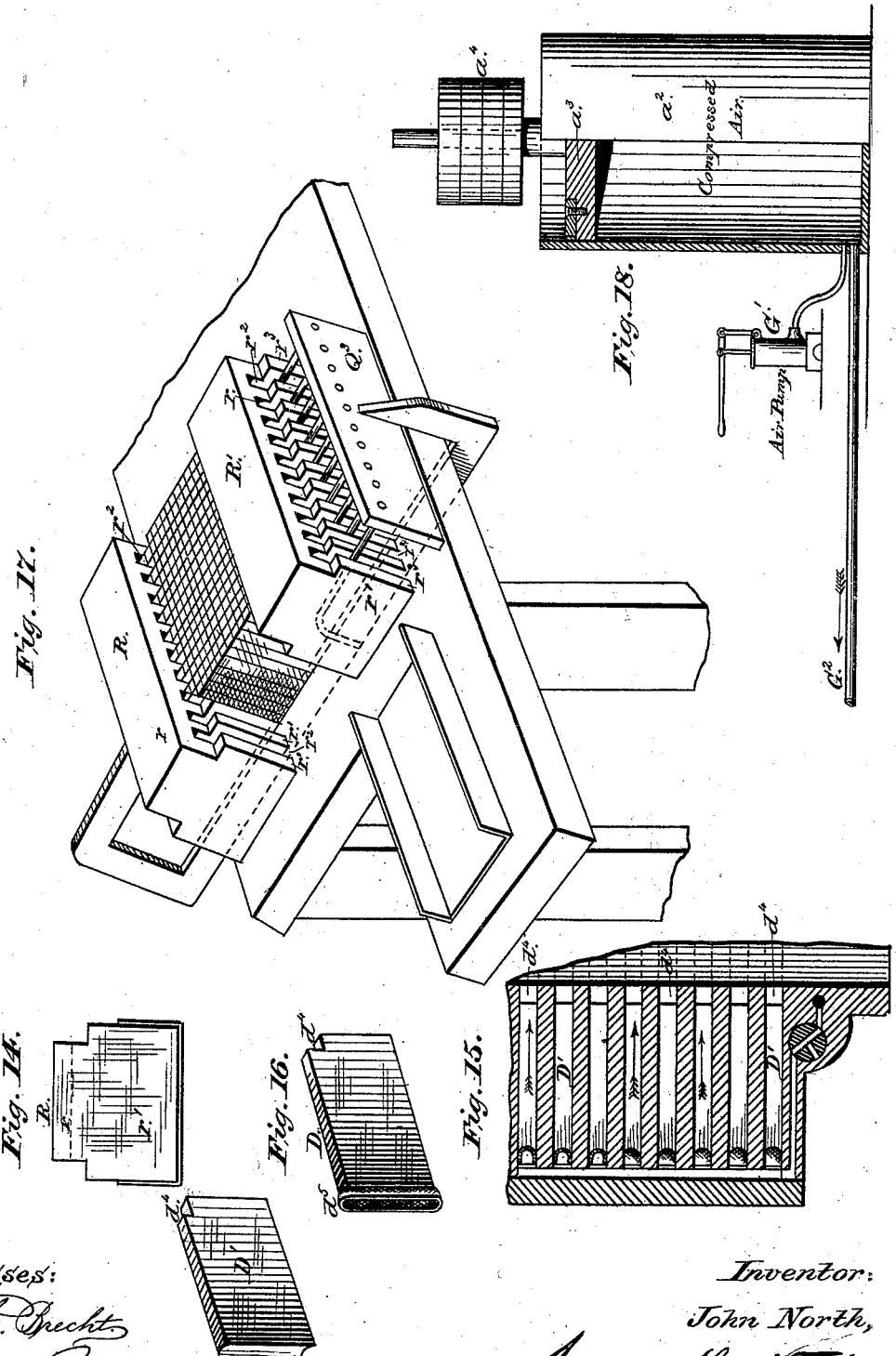

7 Sheets—Sheet 7.

J. NORTH
Type-Distributing Machine.

No. 211,038. Patented Dec. 17, 1878.

Witnesses:
T. C. Brecht.
J. A. Rutherford

Inventor:
John North,
By James L. Norris,
Att'y.

N. PETERS, PHOTO-LITHOGRAPHER, WASHINGTON, D. C.

UNITED STATES PATENT OFFICE.

JOHN NORTH, OF MIDDLETOWN, CONNECTICUT.

IMPROVEMENT IN TYPE-DISTRIBUTING MACHINES.

Specification forming part of Letters Patent No. 211,038, dated December 17, 1878; application filed December 6, 1878.

*To all whom it may concern:*

Be it known that I, JOHN NORTH, of Middletown, in the county of Middlesex and State of Connecticut, have invented certain new and useful Improvements in Type-Distributers, of which the following is a specification:

This invention relates to improvements in machines for distributing printers' movable types.

Types are ordinarily, for manual type-setting, distributed in two "cases" or shallow trays, one of which, called the "lower case," is subdivided into various-sized "boxes" or compartments for the reception, respectively, of the different "small" letters, punctuation-points, numerals, spaces, quadrats, and certain logotypes; the other, or "upper case," being divided by a central transverse wall or bar into two equal parts, which are subdivided into small square "boxes" or receptacles, those on one side of the central bar being for the reception of capital letters, and those on the other side are for small capitals, certain boxes in both divisions being devoted to types for printing various signs, dashes, braces, and reference-marks.

In setting types for use in printing they are lifted from these cases or trays by the right hand and placed in a shallow receptacle, called a "stick," held in the left hand of the printer, and arranged to compose words and lines, which are afterward made up into pages, columns, or forms of various kinds for use in printing with a press.

After having been used for printing the types must be again distributed into the cases and subdivisions thereof, in order to be made available for subsequent use in different forms. This distribution, also, is ordinarily performed by hand, occupying an average time equal to about one-third of the time of setting the same types.

Types are also set or composed by machines, which automatically select the letters from cases adapted especially for such use, and into the subdivisions of which the types must, after being used, be distributed preparatory to a subsequent setting.

Many attempts have been made to perform the distribution of types by machinery; but the complication resulting from the employment of a multiplicity of springs and minute working parts, and the accurate adjustment thereof required, in order to accomplish the automatic selection of the types of different denominations from a body of set type and placing them in proper receptacles, has rendered such machines unreliable in operation, liable to easily become deranged, and very costly.

It is the object of my invention to overcome these difficulties, and distribute types automatically from a column, page, or series of lines into the separate channels or subdivisions of a case or receiver, in which they are so arranged as to be ready for use in an automatic type-setter, or from which they may be speedily transferred to an ordinary type-case for use in manual composition or type-setting.

In carrying out the purpose of my invention, it consists, first, in the combination of the automatic type-moving devices of a type-distributing machine, with motive devices therefor, actuated by air-pressure, whereby is obtained a uniform impelling-force for the type during the entire operation of the machine; second, the combination, in a type-distributing machine, of a type case or receiver, with type-holders arranged at each side thereof, and automatic devices for forcing types from said holders into opposite sides of said case, whereby is obtained a double distribution by a single machine; third, in the combination, in a type-distributing machine, of a traveling type case or receiver, with type-line holders arranged at each side thereof, and automatic distributing devices, by which types are forced from the line-holders into both sides of said case; fourth, in the combination, in a type-distributing-machine, of a reciprocating type case or receiver, a carriage therefor having its side walls cut into wards corresponding to the shapes of variously-notched types, type-line holders arranged on each side thereof, and automatic devices for forcing the type from the line-holders into said case or receiver through said wards, whereby is secured a double action of the distributing devices and the use of removable cases, a number of which may be filled in succession and set aside for further use, as required; fifth, in a method of separating a page, column, or series of lines of types into two parts, by forcing alternate lines simultaneously in opposite directions into line-holders adapted for use in connection with the automatic distributing devices of a type-distributing machine; sixth, in a type-line holder, subdivided into a series of line chambers or channels, in combination with yielding type-supporters coinciding with said chambers or channels, whereby the end type of the lines are prevented from falling while the lines are being forced into the holder preparatory to distribution by an automatic distributer; seventh, in the combination, with the type-line holder of a type-distributing machine, of a shield or guard, consisting of a flat plate of equal width with said holder, and having rims or flanges projecting at right angles from its sides, whereby, when the shield or guard is placed under and against the bottom of the line-holder, the end types of the lines therein will be prevented from falling outward and the lines retained while the holder is being transferred from place to place.

Figure 2:
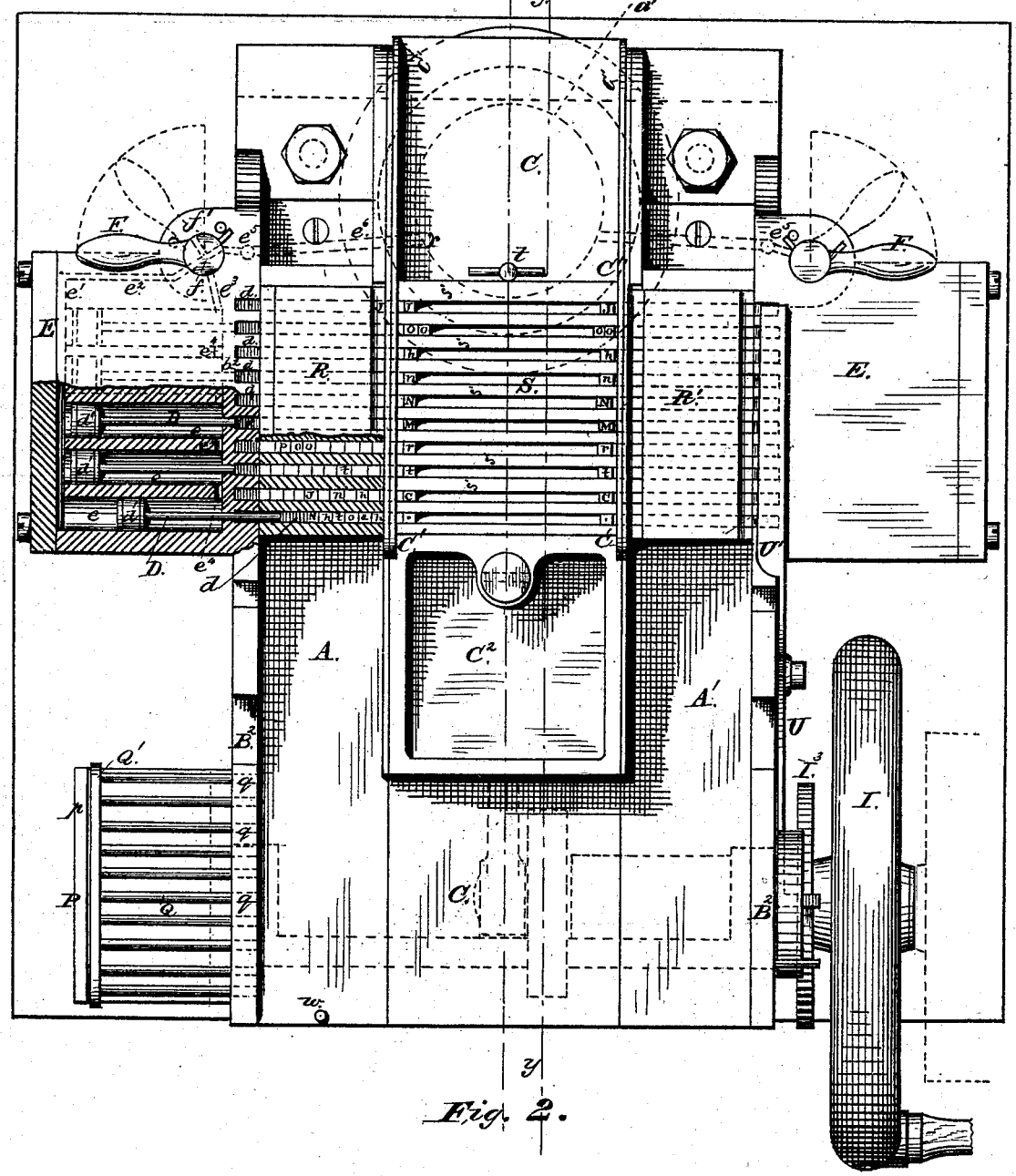
Figure 19:
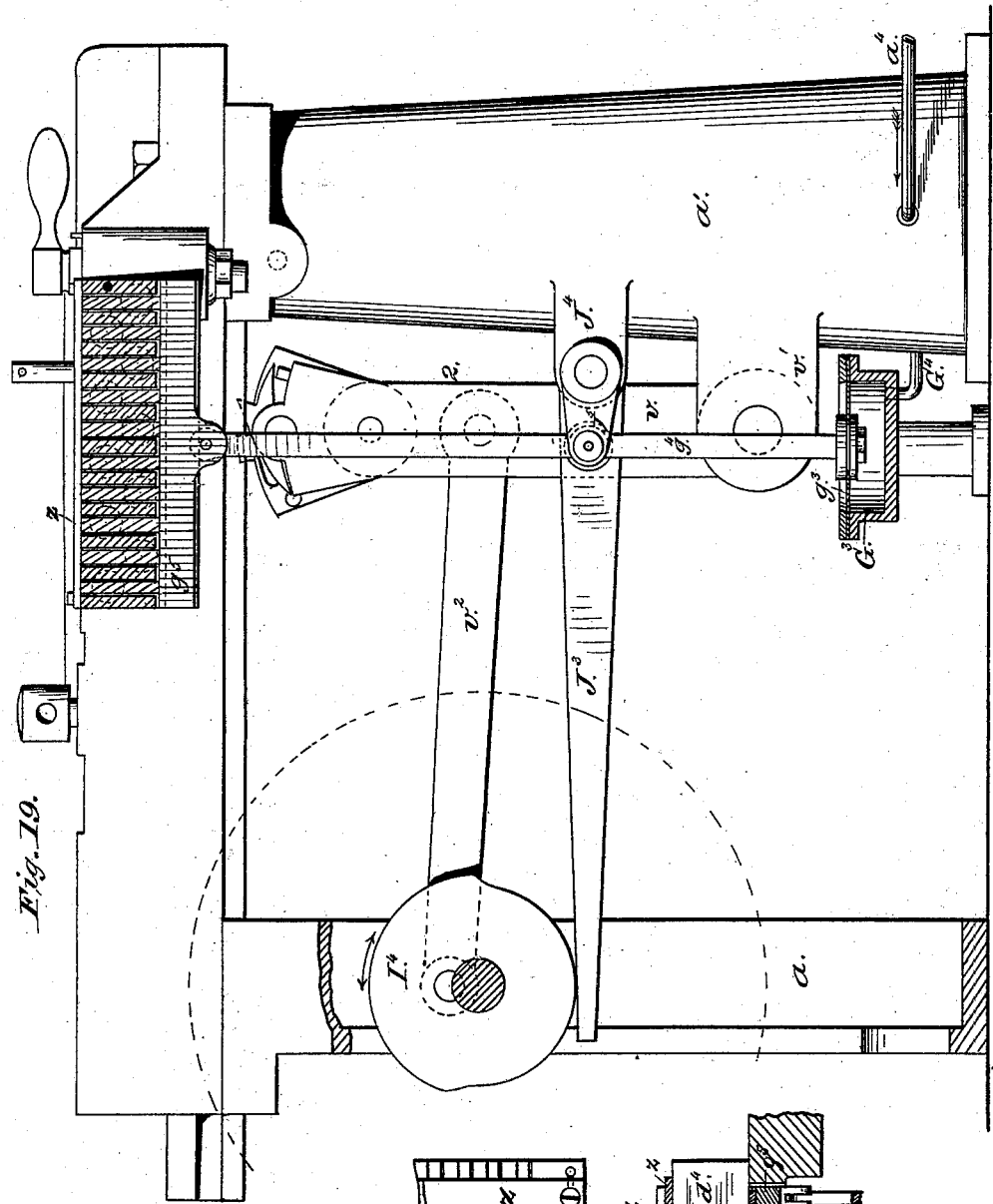
Figure 21:
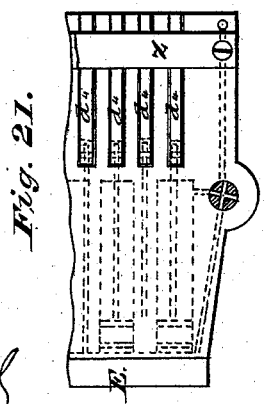
Figure 20:
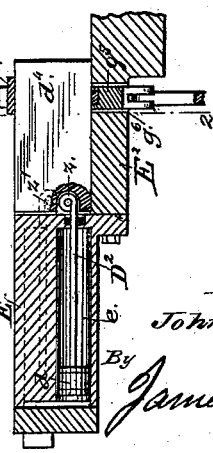

In the accompanying drawings, Figure 1 is a perspective view of my improved type-distributer. Fig. 2 is a top view. Fig. 3 is a vertical section taken mainly on line $y\ y$, Fig. 2. Fig. 4 is an end view of the case or type-receiver carriage. Fig. 5 is a partial side view of the machine. Fig. 6 is a top view of the line-holder arranged on opposite sides of a series of lines of type preparatory to separating the lines. Fig. 7 is a partial end view of the machine, showing the yielding type-supporters. Fig. 8 is a perspective view of the type case or receiver. Fig. 9 is an end view of the same with its cover. Fig. 10 is a bottom view of the case or receiver carriage. Fig. 11 is a perspective view of the automatically-reversible impelling device for operating the carriage. Fig. 12 is a central vertical section, and Fig. 13 is a top view, of the same. Fig. 14 is an end view of a line-holder with its guard applied. Fig. 15 is a horizontal section of line-pusher chamber, showing a modified form of pushers. Fig. 16 shows detached views of pushers. Fig. 17 is a perspective view of a form of table which may be used separately from the machine in separating the lines of a page or column. Fig. 18 is a view, partly in section, of an air compressor and reservoir which may be used in connection with one or more distributers in lieu of an attached air pump and reservoir. Fig. 19 illustrates modified forms of the carriage-impelling devices and the arrester for the type-pushers, and Figs. 20 and 21 are detail views of the modification of the arrester.

It should be understood that the types used in connection with my distributer are adapted thereto by having notches or recesses cut in their edges, the type for each letter and character, and also the spaces and quadrats, being notched differently from all others, and to correspond with a particular ward through which it must pass in the process of distribution.

The stationary top of the machine is supported by suitable legs or standards $a\ a^1$, one of which, $a^1$, is hollow, and forms a reservoir for compressed air. This top is composed of two parallel portions or galleys, A A', having walls or flanges B B$^1$, extending upward from their inner edges, and provided with rectangular parallel openings $b$, of a size to permit the passage flatwise therethrough of the class of types for which the machine is intended. From the inner edges of these parallel portions project splines or guides $b^3$, which fit into corresponding grooves in the edges of a carriage, C, which is also provided with upwardly-extending walls at its longitudinal edges, certain opposite portions of these walls being cut to form wards $c$, each of which corresponds in the contour of its edges with the notched or recessed body of the type of a particular letter or character, space or quadrat, and said wards are the same distance apart as the opening in the walls or flanges of the stationary portions or galleys of the top of the machine. These stationary galleys have also walls B$^2$, extending upward from their outer edges, in which walls are cut recesses $b^2$, corresponding in size to the heads $d$ of certain pushers or longitudinally-playing arms D, the opposite ends of which are provided with pistons $d^1$, which fit snugly in the channels or chambers $e$ of casings E, which are firmly attached to the outer walls of the top portions or galleys A A' of the machine. The length of the channels or chambers $e$ of the casing E is such that when the pistons $d^1$ are at the inner limit of their movement there will be a vacant space between each piston and the outer wall of the casing, and these vacant spaces are connected by the partition-walls between the channels $e$, being cut away evenly therewith, thus forming a continuous air-space, which is connected by a channel, $e^1$, cut transversely in the end wall of casing E, and connecting with a passage, $e^2$, leading longitudinally through the end wall of said casing to a vertical circular opening, forming a seat, in which is fitted a three-way cock, F, having a diametric port, $f$, and an intersecting radial port, $f^1$, at right angles therewith. From the seat of the three-way cock a passage, $e^3$, leads to the front ends of the chambers or channels $e$, which are connected by channels $e^4$ cut in the dividing-walls thereof; and the length of the arms D being such that the pistons $d^1$ cannot come against the inner walls of the channels or chambers $e$, a continuous inclosed air-space is formed at the inner as well as at the outer portion of the casing E. From the said seat of the three-way cock there also leads a passage, $e^5$, connecting with a channel, $e^6$, leading through the intervening walls and opening at $r$ into the compressed-air reservoir $a^1$. Near the base of this air-reservoir is connected therewith an air-pump, G, for forcing air into the same, and the action of which will be readily understood without particular description.

To the piston $g$ of this air-pump is pivoted a pitman, $h$, connected by a link, $h'$, with a crank-pin, $i$, of a disk, $I^1$, on the end of the shaft of the fly-wheel I. The same pin which connects the pitman $h$ and link $h'$ passes through holes in the ends of levers J J$^1$, the opposite ends of which are bent to form broad short arms $j\ j^1$, and are pivoted by a pin, $f^2$, between ears $j^2 j^2$, projecting from the wall of reservoir $a^1$, near its top. These short arms $j\ j^1$ are considerably thicker than the other portions of the levers, and each has its inner face formed with a curved shoulder or shelf, $j^3$ and $j^4$, respectively, immediately over which are centrally pivoted by the same pin, $j^5$, two impelling-pawls, K K$'$, each of which has one of its ends formed with two teeth, $k\ k^1$, the other ends forming curved arms $k^2\ k^2$. These impelling-pawls have their teeth in opposite directions, and immediately below the lower tooth, $k^1$, of each pawl a pin, $l$, is arranged in a socket in the shoulder or shelf over which the pawl is located. These pins rest upon coiled springs, which project them against the under surface of the pawls, forcing the toothed ends of the pawls upward, and the other ends down upon the curved shoulders of the arms $j\ j^1$. Upon the same pin by which the levers J J$^1$ are pivoted to the ears $j^2\ j^2$ a flat dog, M, is pivoted, to play back and forth between the short arms $j\ j^1$ and the pawls. Through the dog is cut a curved slot, $m^1$, embracing the pin $j^5$, which forms the fulcrum of the pawls, permitting the vibration of the dog, from the upper curved edge of which projects a stud, $m$, while from opposite sides of said dog, near opposite edges thereof, project horizontal pins $m^2\ m^2$ over the shoulders $j^3 j^4$. The outer ends of the curved arms of the pawls are beveled upward, as shown in Figs. 11 and 12, so that when one of the horizontally-projecting pins of the dog is at the outer end of the adjacent shoulder, as shown in Fig. 12, the plain arm of the adjacent pawl may be thrown down near the shoulder, and the toothed end of said pawl elevated, as shown in Fig. 11. Now, if the dog M should be thrown into a reverse position, in the direction of the arrow, Fig. 12, the pin $m^2$ would pass under and throw upward the plain arm of the pawl, causing the toothed end thereof to be thrown down upon the shoulder $j^3$, the pin $l$ driven into its socket, and its spring compressed. In their elevated positions the pawls engage with the teeth of ratchet-bars N N$'$, attached to the under side of carriage C, and having their teeth inclined in reverse directions.

It is obvious that when the teeth of one pawl are elevated for engagement with its ratchet, those of the other pawl will be depressed and out of the way, and the vibration of the levers J J$^1$ will cause the upper pawl-tooth to alternately strike a ratchet-tooth and move backward for engagement with another, upward in front of which it is forced by the spring-pin beneath it.

Between the ratchet-bars N N$'$ is a space, $n$, into which the stud $m$ of the dog M projects; and near the ends of the ratchet-bars, and in the path of said stud $m$, are located adjustable lugs O O$'$, which, when the carriage C has reached the end of its travel in either direction, strike the said stud and reverse the position of the dog, throwing down the pawl which has just impelled the carriage, and permitting the other pawl to rise to engage its ratchet and drive the carriage step by step in a reverse direction.

From one of the outer walls, B$^2$, of the top portion or galley, A, of the machine projects a shelf, P, having an upward flange, $p$; and the wall B$^2$ is provided with perforations $q$, through which pass rods Q, the outer ends of which are fixed in a plate, Q$^1$, the edge of which rests across the shelf P, these rods Q being the yielding type-supporters, the operation of which will presently be explained.

The walls at the inner edges of the galleys A A$'$ of the top, and at the longitudinal edges of the carriage C, do not extend the entire length of said top portion and carriage, but are cut away, so that when the ends of the carriage and said top portions are even there will be an uninterrupted surface or table across the top of the machine and carriage opposite the shelf P and between the walls B$^2$. This uninterrupted surface or table is where the page or series of lines of type is separated into two parts preparatory to being placed in position for distribution. This operation is performed by means of the line-holders and yielding type-supporters. Two of said line-holders are shown in perspective views, Figs. 1 and 17, and in top views, Figs. 2 and 6, and each consists of a top plate, $r$, from the under surface of which projects a series of parallel flat plates, $r^1$, of a thickness corresponding with the size of the types with which the holders are to be used, and having between them spaces $r^2$, of a similar width, the depth of these spaces being, however, somewhat greater than the height of the types. The use of these line-holders and the type-supporters will be hereinafter explained.

The type case or receiver S (shown in perspective view, Fig. 8) consists of a bottom plate, $s$, and parallel plates $s^1$, projecting therefrom and forming the dividing-walls of channels or chambers $s^2$, and having a depth not quite equal to the height of the type. In use this case or receiver is placed between the walls C$^1$ of the carriage, in which are cut the wards $c$, and its channels $s^2$ coincide with said wards, so that types passing through the wards will enter the channels. Having been placed in its proper position against the abutment C$^2$ on the top of the carriage, the case or receiver is so held by a post, $t$, inserted in a hole in the top of the carriage.

At one side of the machine, upon the shaft of the fly-wheel I, is a cam, I$^3$, upon the periphery of which rests the end of one arm of a clamp or arresting lever, U, the other arm, U′, of which extends along the top of that portion of the wall B² in which are cut the slots in which rest the rectangular heads of the pusher-arms D, and when the arm U of said lever rests upon the full curve of the cam the arm U′ will be forced down upon said heads and prevent them from moving; but when the depressed portion $i^3$ of said cam is passing under the lever, said end will be forced down by the spring $u$, and the other arm, U′, raised to release the pusher-heads. The cam I³ is so formed and arranged as to cause the arm U′ of the lever to clamp the pushers when the carriage is moving, but to release them during the momentary rest of said carriage, when the impelling-pawl moves backward to catch a fresh tooth of the ratchet-bar, at which time the wards of the carriage coincide with the openings in the walls B and B¹ and the position of the lines in the type-holders.

The object of the clamp-lever is to hold the pushers so that they will not press against the lines and cause a wearing friction of the types against the moving carriage when there is no necessity for such pressure, as it will be readily understood no pressure upon the lines is required except when the wards and said lines coincide in position.

Though in the drawing the machine is shown with a clamp-lever only at one side of the machine, in practice both sets of pushers should have such a clamp; and I propose also to use a form of pushers shown in Fig. 16, in which the entire pusher D′ is of the same width, as shown also in the modification, Fig. 15, so that the clamps will act upon said pushers during the whole stroke of each. The extent of notch $d^4$ shown in this modified form of pusher is not equal to the width of the clamp-lever, and will not, therefore, interfere with its action. In order to insure the efficient working of this form of pushers, I provide their inner ends with suitable packing $d^5$, consisting of rubber or leather cups arranged in grooves in said ends.

In the machine illustrated by the accompanying drawings, the side walls of the carriage C have but ten wards each, and has, therefore, only the capacity to distribute a body of set types comprising ten different letters, characters, spaces, or quadrats; but, in practice, a full working machine should have in each wall of the carriage a ward corresponding to the notched body of the type on nearly every letter and character, space, and quadrat in a font of the kind to which the machine is adapted—for instance, in each side wall of the carriage in a full-sized machine should there be for lower-case letters twenty-six wards, numerals ten; capitals, twenty-six wards, punctuation-points five; small capitals, twenty-six wards, spaces three; logotypes, five wards, quadrats one; diphthongs, six wards, reference-marks and signs, &c., about three, equaling one hundred and eleven wards, rendering necessary a case or receiver having an equal number of channels or chambers. The cases may be formed of separate sections, and may also comprise chambers for italic types, for which additional wards would, of course, be required in the carriage-walls.

Referring, however, for illustration of my invention to the drawings, let it be supposed that W, Fig. 6, represents a page containing twenty lines of type. The front edge of the carriage C having been brought even with the edges of the galleys A A′, the line-holder R is placed upon the galley A, its outer end resting against a pin, $w$, the diameter of which equals the width of one of the channels or chambers of said holder. The plate Q¹ is then pressed inward, causing the rods or type-supporter Q to enter the channels or chambers of the line-holder, and the page W is placed alongside said holder, with the ends of alternate lines against the ends of rods Q, and the other lines resting against the ends of the dividing-plates $r$. Now, against the opposite edge of the page is placed another line-holder, R′, its inner end resting against the abutment C² of the carriage, and the ends of its parallel plates $r^3$ against the ends of those lines of the page which coincide with the channels or chambers of the other line-holder. A series of type-supporting rods, Q², fixed to a plate, Q³, is now inserted into the channels of the line-holder R′ and said holder pressed firmly against the page, alternate lines of which will be driven by the plates $r^3$ into the channels of the line-holder R, while the remaining lines are received into the channels of the holder R′. The outer-end types of all the lines are, during the operation, prevented from falling by the type-supporting rods, those fixed to the plate Q yielding, and said plate sliding outward across its supporting-shelf P as the lines advance against them, while those attached to plate Q³ remain stationary as the holder R′ recedes from said plate and embraces its lines. The page having thus been separated into two parts, the line-holders are shoved into the portions of the galleys A A′ between the pushers and the opposite walls, which have the rectangular openings $b$ cut therein, and the machine is now ready for operation, as follows:

Turn the two three-way cocks so that air-passages will be opened from the reservoir $a^1$ to the rear of pusher-pistons, and rotate the fly-wheel I, which, through the operation of the disk I¹, its crank-pin, and link $h'$, actuates the air-forcing pump to compress air in the reservoir $a^1$, and the levers J J¹ to cause one or the other of the pawls to impel the carriage C by a step-by-step motion. As shown in Fig. 3, said carriage is supposed to be moving in the direction of the arrow, in which direction it will continue to move until the lug O strikes the stud $m$, forcing the dog M into a position to depress one pawl and permit the other pawl to rise for engagement with its ratchet, when the direction of motion of the carriage will be reversed, as hereinbefore explained.

The pressure of the air upon the pistons $d$ forces the heads of the pushers against the lines of type in the holders, and forces the end types of the lines into the rectangular openings in the walls B B$^1$ of the galleys; and whenever, in one of the intermissions in the step-by-step motion of the carriage, a ward of the wall of said carriage is brought into coincidence with a type notched in correspondence therewith, said type will, in consequence of the pressure of the pusher on the line, be forced quickly through said ward and into the channel or chamber of the type case or receiver which coincides with said ward.

It may happen that several wards will at the same moment be brought into coincidence with correspondingly-notched types, when all of said types will be forced through their respective wards and into the case or receiver; and several channels or chambers of the case or receiver may thus receive type at both ends at the same time.

It will be seen that every line in the holders must part with at least one type during the complete passage of the carriage in either direction, as a ward corresponding to every type will stop momentarily at every line; and a single line may part with several types in a single passage of the carriage, owing to the successive coincidence of wards with correspondingly-notched types at the end of said line.

The step-by-step movement of the carriage exactly equals the distance between two lines of type, and the shape of the cam I$^3$ is such that during this movement the clamp or arresting lever bears firmly upon the pushers, and thus relieves the lines from pressure, which would otherwise cause a wear of the types by the friction of the walls of the carriage.

The operation of the machine should continue until all the type in the line-holders are transferred to their proper channels in the case or receiver, and then by turning the three-way cocks so as to open air-passages from the reservoir to the front of the pistons $d^1$, as hereinbefore described, the pushers may all be simultaneously retracted into the casings E, when the machine will be ready for receiving another set of line-holders; and in order to save time several sets of holders should be provided for each machine, and they may be filled by dividing the pages, portions of columns, or other forms on a table separate from the machine, as shown in Fig. 17, where the table is shown as having its top inclined, so that but one type-supporter, Q$^2$, is needed.

When the type case or receiver has been filled it may be removed from the carriage and replaced by an empty case. The filled case, while being handled or when set aside for future use, should be covered by a guard or shield, as shown in Fig. 9, the sides of said guard or shield projecting downward alongside the case to prevent the types from falling out the ends of the channels or chambers. I also provide the line-holders with similar guards or shields, which should be placed beneath the line-holders when they are to be transferred from the table to the machine, but need only be placed over said holders when the same are simply required to be shoved from place to place on a flat surface, such as the galleys or front table of the carriage.

Instead of having the air-pump and reservoir attached to the machine, as shown in Figs. 1 and 3, the three-way cocks may be connected, by any suitable means, with a pipe leading from a compressed-air reservoir entirely separate and at a distance from the machine.

In Fig. 18 is shown a suitable form of reservoir for giving uniform pressure by means of a weighted piston.

The letter $a^2$ indicates the reservoir, and $a^3$ is piston, provided with a central standard, upon which may be placed suitable weights $a^4$. G$^1$ is the air force-pump for supplying the reservoir, and G$^2$ is an air-pipe leading to the machine. This pipe G$^2$ may have several branches leading to different machines; or several pipes may lead from the said reservoir direct to the machine.

In the modification of my invention shown in Figs. 19, 20, 21, G$^3$ indicates an air-chamber, which is provided with a diaphragm, $g^3$, having connected thereto an upward-extending rod, $g^4$, the top of which is pivoted to the center of a plunger or pressing-bar, $g^5$, which fits into a slot, $g^6$, cut through a shelf, E$^2$, which supports the heads $d^4$ of a modified form of pushers, D$^2$. The outer arrangement of the parts shown is similar to that shown in Figs. 1 and 3; but the pusher-heads are larger and are pivoted to their pushing-rods, as shown at $z\ z'$. Immediately above the pusher-heads and across them is fixed a stationary bar, Z, in contact with the upper edges of said heads. Upon the upper edge of the plunger $g^5$ is a strip of leather, rubber, or similar material.

The air-chamber G$^3$ is connected to the reservoir $a^1$ by a pipe, G$^4$, and the pressure of the air upon the diaphragm $g^3$ pushes upward the rod $g^4$, causing the pusher-heads to be clamped between the plunger or pressing-bar $g^5$ and the bar Z. A continuous clamping-pressure is thus exercised upon the pusher-heads, except when released by the action of a cam, I$^4$, upon an arm, J$^3$, which is fixed to a short rock-shaft, having its single bearing in an ear, J$^4$, projecting from the reservoir-wall, and from which rock-shaft an arm, J$^5$, projects outward, and is pivoted to the rod $g^4$. The cam I$^4$ is on the main or fly-wheel shaft, and is so cut and arranged as to cause the depression of the plunger or pressing-bar and release the pushers only when the wards of the carriage coincide with the lines in the type-holders, as heretofore explained.

The reservoir shown in this modification is adapted to have air compressed therein by a compressor separate from the machine, and receive air through a pipe, $a^4$. The carriage-impelling lever $v$ is pivoted to ears $v^1$, projecting from the wall of the reservoir near its base, and said lever is connected with a crank-pin on cam-disk $I^4$ by a link, $v^2$.

The reciprocating type-receiver carriage and the automatically-reversible step-by-step impelling mechanism, whereby the receiving-case carriage is caused to reciprocate, and the automatic intermittent arresting device for the type-line pushers, whereby the type to be distributed are relieved from pressure when not required to be moved, are embraced in an application heretofore filed by me, and therefore do not form the subjects of claims in this application.

Having thus described my invention, what I claim is—

1. The combination of the automatic type-moving devices of a type-distributing machine, with motive devices, substantially as described, actuated by pneumatic pressure, whereby is obtained a uniform impelling-force for the type during the entire operation of the machine, substantially as set forth.

2. The combination, in a type-distributing machine, of a type case or receiver with a type-holder arranged at each side thereof, and automatic devices, substantially as described, for forcing types from said holders into opposite sides of the said case, whereby is obtained a double distribution by a single machine.

3. The combination, in a type-distributing machine, of a traveling type case or receiver with line-holders arranged at each side thereof, and automatic distributing devices, substantially as described, by which types are forced from said line-holders into both sides of said case, substantially as set forth.

4. The combination, in a type-distributing machine, of a reciprocating type case or receiver, a carriage therefor having its side walls cut into wards corresponding to the shape of variously-notched types, type-line holders arranged on each side thereof, and automatic devices for forcing the type from the line-holders into said case or receiver, through said wards, substantially as described, whereby is secured a double action of the distributing devices and the use of removable cases or receivers, a number of which may be filled in succession and set aside for further use, as required.

5. The method of separating a page, column, or series of lines of types into two parts, substantially as hereinbefore set forth, the same consisting in forcing alternate lines simultaneously in opposite directions into line-holders adapted for use in connection with the automatic distributing devices of a type-distributing machine.

6. The combination of a type-line holder subdivided into a series of line chambers or channels with yielding type-supporters coinciding with said chambers or channels, and receding therefrom as the lines enter, whereby the end types of the lines are prevented from falling during the process of filling the holders, substantially as set forth.

7. The combination, with the type-line holder of a type-distributing machine, of a shield or guard consisting of a flat plate of equal width to said holder, and having rims or flanges projecting from its sides, substantially as described, whereby when said shield or guard is placed under and against the bottom of the line-holder the end types of the lines therein will be prevented from falling, and the lines retained while the holder is being transferred from place to place.

In testimony that I claim the foregoing I have hereunto set my hand in the presence of the subscribing witnesses.

JOHN NORTH.

Witnesses:
JAMES L. NORRIS,
JAS. A. RUTHERFORD.